April 26, 1966  S. J. HOWARD ET AL  3,247,540
WINDSHIELD WIPER
Filed Aug. 1, 1963  3 Sheets-Sheet 2
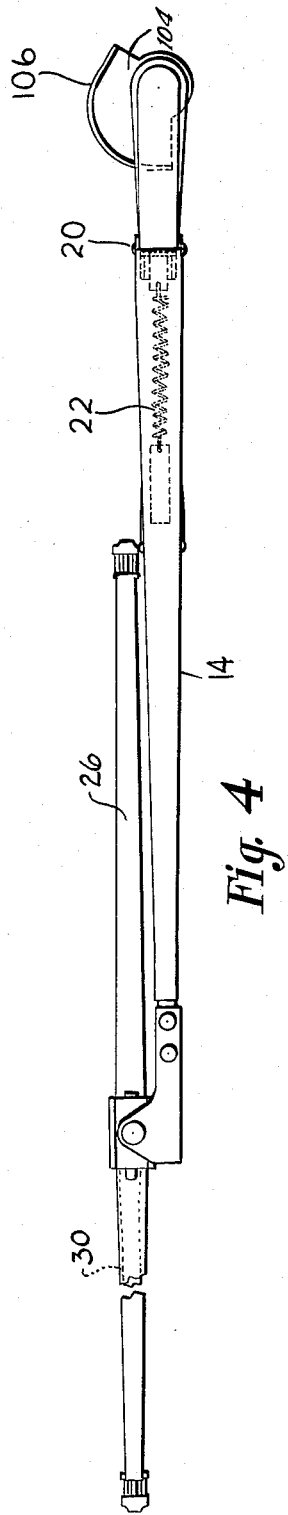
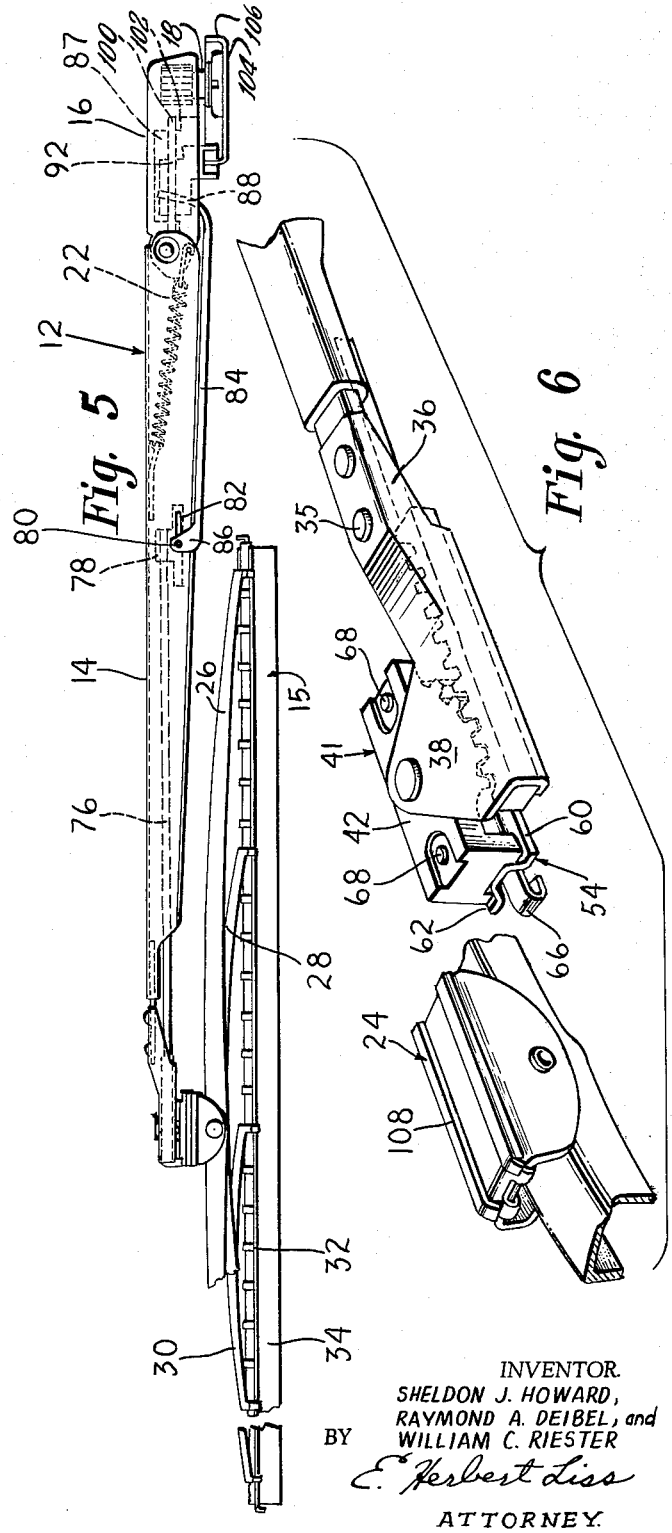
INVENTOR.
SHELDON J. HOWARD,
RAYMOND A. DEIBEL, and
WILLIAM C. RIESTER
BY
E. Herbert Liss
ATTORNEY.

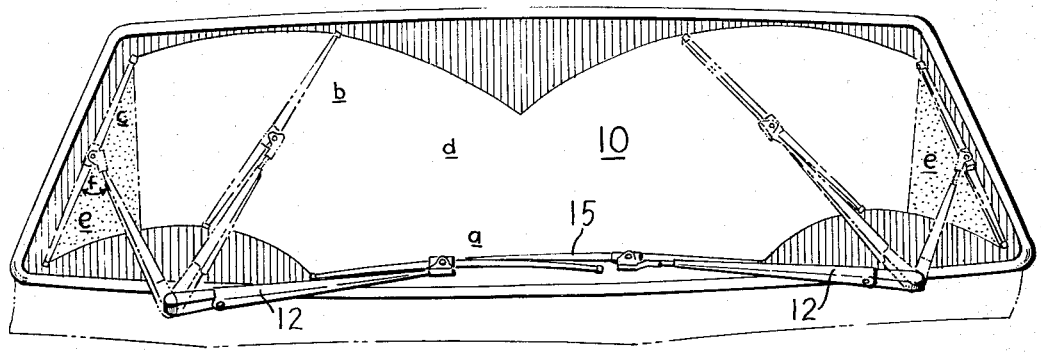
Fig. 1
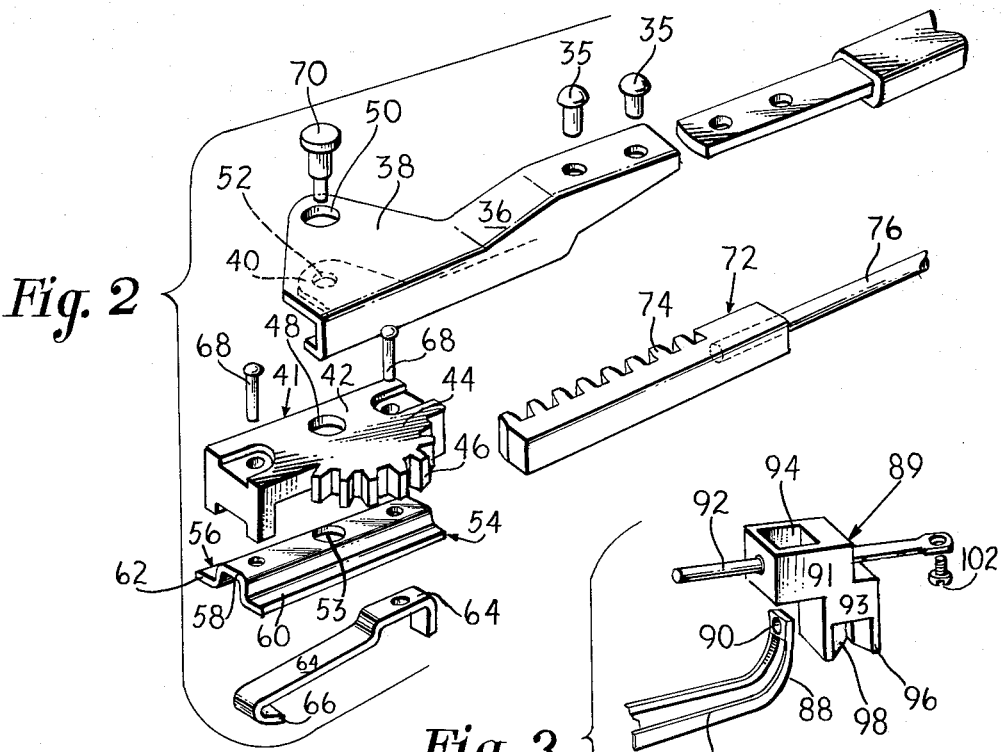
Fig. 2
Fig. 3
INVENTOR.
SHELDON J. HOWARD,
RAYMOND A. DEIBEL, and
BY WILLIAM C. RIESTER
E. Herbert Liss
ATTORNEY.

United States Patent Office 3,247,540
Patented Apr. 26, 1966

3,247,540
WINDSHIELD WIPER
Sheldon J. Howard, 74 Fields Ave., Buffalo, N.Y.; Raymond A. Deibel, 229 E. Treehaven Road, Cheektowaga, N.Y.; and William C. Riester, 5330 Greenhurst Road, Williamsville, N.Y.
Filed Aug. 1, 1963, Ser. No. 299,427
8 Claims. (Cl. 15—250.23)

The present invention relates to improved windshield wiper apparatus for motor vehicles and, more particularly, to a windshield wiper arm for use in an opposed motion type windshield wiper apparatus utilizing overlapping wiper blades wherein a pair of wipers is capable of wiping substantially the entire surface contour of an inclined windshield having converging outboard edges.

Newer type windshields are severely inclined rearwardly from the cowl to the roof line. The lateral outboard edges converge to form a windshield which is substantially wider at the base or lower edge adjacent the cowl of the vehicle than at the top or upper edge adjacent the roof line of the vehicle. With these newer type windshields, presently used windshield wipers leave a substantial unwiped angular area adjacent the outboard portions of the viewing area of the windshield. This is because the longitudinal axis of the blade is held fixed with respect to the longitudinal axis of the arm on an axis perpendicular to the glass. Thus the inner end of the blade traverses a smaller arc than the outer end of the blade.

The present invention utilizes a construction wherein apparatus is provided on the arm which pivots the blade as much as forty-five degrees or more, if required, relative to the longitudinal axis of the arm on an axis perpendicular to the glass, thereby cleaning an angular area otherwise left unwiped by a conventional wiper construction. The conventional wiper construction confines the blade to a fixed angular relationship with respect to the longitudinal axis of the arm on an axis perpendicular to the glass. In the present invention positive pivotal movement of the blade about an axis perpendicular to the glass tends to drive the blade in a path approaching a horizontal path, thus decreasing the differential between the length of the arc at the upper and lower edges of the wiping pattern.

The wiper arm of this invention is particularly useful when utilized with a pair of wipers having arms arranged to pivot about the axis of the wiper arm drive shafts mounted proximate the crest of a contoured windshield. Wipers of increased length may be utilized to provide for substantial overlap of the arm carried blades in the severely inclined medial area of the windshield. The blades, in turn, are mounted as described for limited pivoting with respect to the arm on an axis perpendicular to the glass. This construction provides for positive pivotal movement of the blades relative to the arms in one direction on the outboard stroke and in the opposite direction on the inboard stroke. With this arrangement, the outboard lateral viewing portion of the windshield is wiped by each blade and the medial area is wiped by both blades to provide clear vision from side to side, leaving negligible uncleared area either on the lateral outboard portions or the medial portion of the windshield.

The principal object of the present invention is to provide an improved wiper arm construction which together with a blade mounted thereon, when used in conjunction with a similar wiper arm and blade, and when the blades are of such length as to overlap in the medial portion of the windshield, is capable of providing a positive and consistent wipe pattern for substantially the entire surface of a severely rearwardly inclined windshield having upwardly converging outboard edges. Another object of the invention is to provide improved windshield wiping apparatus for vehicles which is capable of providing a positive and consistent wiping pattern which covers the substantially entire surface of severely rearwardly inclined windshields having upwardly converging lateral edges, which apparatus permits movement of the windshield wiper blade toward and away from the windshield.

A further object of the present invention is to provide an improved wiper arm adapted for releasably mounting a blade thereon which is capable of providing positively controlled angular displacement of the longitudinal axis of the blade relative to the longitudinal axis of the arm on an axis perpendicular to the windshield.

A still further and more specific object of the invention is to provide an improved wiper arm capable of providing movable control for a blade on an axis perpendicular to the glass to vary the degree of the blade's radial attitude relative to the axis of the arm carrying pivot shaft in which a motion transmitted through a radially movable follower mounted in interlocking relationship with a stationary arcuate track adjacent the pivot shaft and wherein movement is obtained by the variation in the radial position of the follower as it moves about the axis of the pivot shaft in an arcuate path.

Other objects and advantages of the invention will be apparent from the following detailed description taken in connection with the accompanying drawings in which:

FIG. 1 is a front elevational view of a windshield incorporating the wiper construction of the present invention showing the wiper in various positions during operation;

FIG. 2 is an exploded perspective view of the outer end of the windshield wiper arm of this invention;

FIG. 3 is an exploded perspective view of the cam follower and associated linkage;

FIG. 4 is a top elevational view of the wiper apparatus of this invention;

FIG. 5 is a side elevational view of the wiper apparatus of this invention;

FIG. 6 is a partially exploded view similar to FIG. 2 showing the outer end of the arm in its assembled condition;

Figure 7:
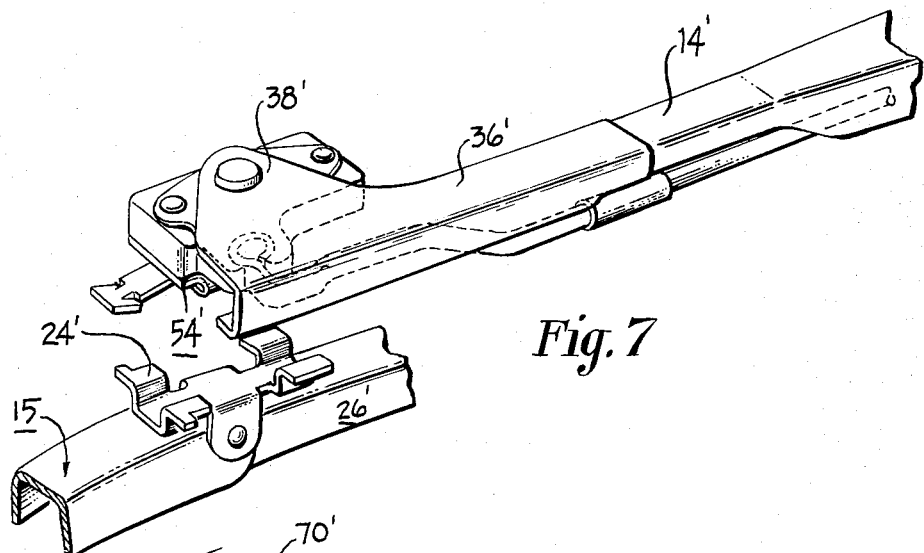
FIG. 7 is a view similar to FIG. 6 showing a modified embodiment of the invention.

Briefly, the windshield wiper apparatus of this invention includes an arm having suitably mounted articulated linkage. The linkage is connected at its inner end to a cam follower by a lost motion connection. The cam follower is disposed within the mounting head portion of the hollow tubular arm and is interlockingly engaged with a cam disposed adjacent the pivot shaft, which pivot shaft drivingly engages the arm. At its outer end the linkage includes a rack slidably mounted within the outer end of the arm. The rack drivingly engages a pinion pivotally mounted adjacent the outer end of the arm and the pinion includes a connector rigidly secured thereto for rigidly engaging a clip on the arm.

In FIG. 1 there is shown a contoured panoramic windshield 10. Mounted adjacent the lower edge of the windshield for oscillatory pivotal movement are a pair of wiper arms 12, each having removably secured at its outer end a wiper blade 15. The arms and blade are shown in their parked position in full line at "a," at an intermediate position in dotted line at "b" and at the outboard end of its stroke at "c" in dotted line. The unshaded area "d" illustrates a portion of a windshield swept by the current nonarticulated arm and blade connection and the dotted areas "e" at the outboard end of the windshield shown illustrate the additional area which can be wiped by the articulated arm construction of this invention.

The wiper arm of the instant invention is illustrated for use in a windshield cleaner combination including a conventional rockshaft 18 which is driven by a motor of any suitable or desirable type, not illustrated, rockshaft 18 being journaled in the vehicle cowl adjacent the bottom edge of the windshield 10. A two section arm is employed having an outer section 14 and an inner section 16. The inner section is mounted on the outer end of rockshaft 18 for oscillation therewith. The sections 14 and 16 may be pivotally connected as at 20 and a biasing spring arrangement 22 of a known form may be provided for urging the outer arm section 14 toward the surface of the windshield 10 in a known manner. A wiper blade 15 may be removably secured to the outer end of the arm section 14 by an attaching clip 24 on the blade cooperating with a bayonet type connector on the arm.

The blade 15, which may be any of various known types, has in the example illustrated herein a pressure distributing superstructure including a rigid primary member 26 pivotally supporting at its outer end a lever 28 intermediate its ends. The outer end of lever 28 pivotally supports a member 30 intermediate its ends. The inner end of primary member 26, the inner end of lever 28, and the opposite ends of member 11 are connected to a blade body unit including a resilient backing 32 which is laterally substantially rigid, but flexible in a plurality of planes substantially normal to the surface of windshield 10. An elongated flexible blade body 34 is supported and urged into surface conformance by the resilient backing 32. It will be understood that the arm of this invention, in accordance with the broader aspects thereof, is not limited to use with such a blade, but can be used with any of various different types of blades either presently adapted or readily modified to receive the arm.

The outer arm section 14 has rigidly secured thereto, as for example by rivets 35, as shown, or integral therewith, or secured thereto in any other suitable or desirable manner, a terminal part 36 of substantially channel-shaped configuration open at a side thereof. The legs of the channel member adjacent the outer end thereof terminate in a pair of ears 38 and 40 having aligned openings 50 and 52. A pinion assembly 41, including a body portion 42 and a pinion segment 44 having teeth 46 is received between the ears 38 and 40. The pinion assembly 41 has an opening 48 in the body portion 42 at the center of the arc formed by the pinion segment 44, which opening is in alignment with openings 50 and 52 in ears 38 and 40, respectively. The pinion body has secured thereto or integral therewith a bayonet type connector assembly 54 which includes a connector 56 having a web portion 58 and offset side rails 60 and 62. A leaf spring 64 is secured to the web portion 58 and includes a hook-shaped terminal portion 66 for engagement with the clip 24 on the blade 15. An opening 53 in the connector 56 is disposed in alignment with openings 48, 50 and 52. The connector 56 may be secured to the pinion body 42 in any suitable manner, as for example by rivets 68, as shown, or may be formed integral therewith. A stud 70 is received in the openings 48, 50, 52 and 53 and forms a pivot pin to pivotally secure the pinion body 41 together with connector 56 between the ears 38 and 40. A rack 72 having teeth 74 on one side thereof is slidably received in the channel of terminal part 36 and the teeth 74 intermesh and engage the teeth 46 of the pinion segment 44.

An elongated link 76 is rigidly secured at one end to the rack 72 by a press fit, as shown, integrally, or by any other suitable or desirable means. The elongated link 76 extends into a hollow tubular portion of the outer arm section 14 and has secured at its end a slidable body 78. The slidable body 78 is retained within the tubular central portion of the outer arm section 14 for limited slidable movement by a pin 80 extending transversely of the arm section 14 and into a slot 82 on each side wall of the hollow tubular portion of arm section 14. A rigid elongated link 84 having a bifurcated end portion 86 forming a pair of ears having aligned apertures therethrough is connected to the slidable body 78. The bifurcated end portion 86 straddles the slidable body 78 and the pin 80 extends through the openings in the ears 86 to pivotally secure the rigid link 84 to the slidable body 78. The rigid link 84 at its other end has an upturned end portion 88 with an opening 90 at the free end thereof which slidably receives a guide rod 92.

Mounted in a recess 87 formed in inner arm section 16 is a cam follower assembly 89, best shown in FIG. 3. The cam follower assembly comprises a slidable body section 91 and a cam follower section 93. The slidable body section 91 has an enlarged aperture 94 extending therethrough from the upper to the lower surface and has aligned openings 96 and 98 in longitudinal alignment with the longitudinal axis of the wiper arm extending into the aperture 94. The aligned openings slidably receive rod 92 and the upturned portion 88 of rigid link 84 is disposed within the aperture 94 with opening 90 slidably received on the rod 92. Depending from the slidable body section 91 is the cam follower 93 which includes a pair of cam follower legs 96 and 98 disposed in opposition for interlockingly receiving a cam therebetween. The cam follower assembly 89 is positioned within the recess 87 and retained therein by securing of the inner end of rod 92 to a shoulder 100 on the mounting head of inner arm section 16 by any suitable method, as for example, by a screw 102, as shown, and by the securing of the other end in the opposite side of the recess 87 by any suitable or desirable method such as a press fit or a splined fit, as shown. Disposed about the pivot or rockshaft 18 is a cam plate 104 having an upstanding rim or flange 106 which is received between legs 96 and 98 of cam follower 93 and forms a camming surface.

The blade 15 has mounted for pivotal motion on a transverse axis on member 26 of the superstructure a blade clip 24 which includes a pair of elongated tracks 108 along each longitudinal edge. The tracks 108 are each closed at their outer ends and open at their inner ends. The rails 60 of connector 54 are slidably received within the tracks and the closed ends of the tracks form a stop to prevent removal of the blade through the outer end of the clip. The hook 66 of spring 64 engages over the end of the clip 24 and prevents rearward removal of the blade from the arm, but by manual manipulation the spring may be disengaged from the clip 24 to permit removal of the blade from the arm for replacement.

The operation of the wiper apparatus of this invention should now be apparent. When the pivot shaft 18 is oscillated, the cam assembly 89 reciprocates on the rod 92. As the cam follower moves forward or outward, a wall of the aperture 94 engages the upturned portion 88 of the rigid lever 84, driving the rigid lever outward. The rigid lever 84 in turn drives the slidable body 78 outward, together with the link 76. The link 76, in turn, moves the rack 72 outward. The engagement of teeth 74 of rack 72 with teeth 46 of pinion segment 44 causes rotation of the pinion segment together with the connector 56 and the blade 15. On reversal of direction of rotation of the rockshaft 18, the wall of the aperture 94 engages the upturned portion 88 of the rigid lever 84, driving it inwardly thereby causing slidable body 78, link 76 and rack 72 to move rearwardly or inwardly thereby pivoting the blade 15 in the opposite direction through pinion segment 44. Thus, oscillation of the arm results in angular displacement of the longitudinal axis of the arm and the blade relative to each other. The cam is so designed that when the blade moves from the parking position at "a" to the outboard position at "c," the blade moves through the angle "f," as seen in FIG. 1, thus wiping the heretofore unwiped triangular area "d."

Figure 8:
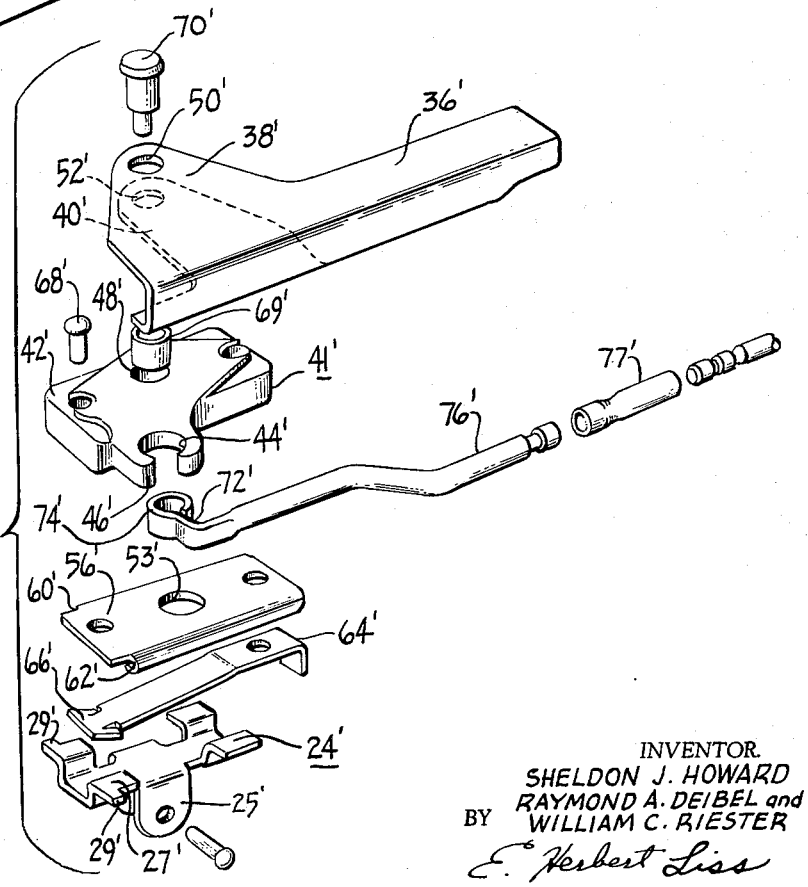
FIG. 8 is an exploded perspective view similar to FIG. 2 of the embodiment illustrated in FIG. 7.

A modified embodiment of the invention is shown in FIGS. 7 and 8. The arm and blade may be similar to the arm and blade of the embodiment shown in FIGS. 1 to 6 and will not be described in detail. Corresponding parts in this embodiment will be identified by corresponding numbers with a prime affixed.

As in the first embodiment, the blade 15', may be of any of various known types and include a pressure distributing superstructure including a rigid primary member 26'. The outer arm section 14' has rigidly secured thereto in any suitable manner, as for example by crimping as shown, a terminal part 36' substantially channel-shaped configuration open at a side thereof. The legs of the channel member adjacent the outer end thereof terminate in a pair of ears 38' and 40' and have aligned openings 50' and 52' therethrough.

A pivot bearing assembly 41', including a body portion 42' and a substantially cylindrical pivot bearing 44' having an opening 46' is received between the ears 38' and 40'. The bearing assembly 41' has an opening 48' in the body portion 42' which is in alignment with openings 50' and 52' in ears 38' and 40', respectively. The bearing assembly body portion 42' has secured thereto or integral therewith a bayonet-type connector assembly 54' which includes a connector 56' having side tracks 60' and 62'. A leaf spring 64' is secured intermediate the tracks 60' and 62' and includes a terminal retaining portion 66' for engagement with a clip 24' on the blade 15'. The clip 24' is pivoted by a pair of ears 25' for pivotal movement on the primary member 26' of the blade superstructure on an axis transverse to the longitudinal axis of the arm blade. Clip 24' includes a pair of offset rails 27' and retaining ears 29' at the ends of the rails. The rails 27' are receivable within the tracks 60' and 62' on the arm. The retaining ears 29' retain the clip 24' against movement in one direction within connector 56' and the retaining portion 66' on spring 64' after assembly of the blade and arm engages the clip 24' to prevent undesired movement in the opposite direction. The arm and blade may be separated by actuation of the spring 64' to disengage the retaining member 66' from engagement with the clip 24'. An opening 53' in the connector 56' is disposed in alignment with openings 48', 50' and 52'. The connector 56' may be secured to the pinion body 42' in any suitable manner as, for example, by rivets 68' as shown or may be formed integral therewith. Stud 70' rotatable within a bearing 69' is received in the openings 48', 50', 52' and 53' and forms a pivot pin to pivotally secure the bearing assembly body 41' together with connector 56' between the ears 38' and 40'.

An elongated link 76' is provided and has a flattened end portion 72' formed with a cylindrical pivot stud 74' at the end thereof. Although this is shown as an integrally formed cylindrical stud, in accordance with the broader aspects of this invention, the stud may be a solid stud member secured to the end of the link 76' or it may merely be a projection perpendicular to the link 76' or any other suitable actuating formation. The stud 74', or other suitable actuator, is received within the open pivot bearing 44'. Its other end extends inwardly toward the outer arm portion 14'. If desired, the link 76' may be formed in two parts connected together with a coupler 77' for proper adjustment during manufacture. The link 76' corresponds to the link 76 of the modification shown in FIGS. 1 to 6 and the structure of the arm, the cam follower and the cam assembly is identical with the corresponding structure shown in FIGS. 1 to 6 including the slidable body 78, the link 84, cam follower assembly and cam.

It should now be apparent that a unique windshield wiper arm has been shown and described which provides positive and consistent lateral angular displacement between the longitudinal axis of the arm and the longitudinal axis of the blade which increases toward the outboard position of the wiper arm to thereby substantially increase the wiped area.

Although certain specific embodiments of the invention have been shown and described for the purpose of illustration, it will be apparent that in its broader aspects, various modifications and other embodiments are possible within the scope of the invention. It is to be understood, therefore that the invention is not limited to the specific arrangements shown, but in its broadest aspects it includes all equivalent embodiments and modifications which come within the scope of the invention.

What is claimed is:

1. Windshield wiping apparatus for a vehicle comprising a wiper arm adapted to be mounted on a pivot shaft adjacent one end, linearly reciprocating means anchored for radial movement in an arcuate path at said one end of said arm, means adjacent said pivot shaft in positive engagement with said linearly reciprocating means for actuating said linearly reciprocating means; linearly slidable means and pivotal means having a fixed axis disposed at the other end of said arm interengageably mounted and linkage means secured to said linearly reciprocating means for limited slidable movement for transmitting motion from said linearly reciprocating means to said linearly slidable means and to said pivotal means in each of two directions alternately in response to radial movement of said linearly reciprocating means alternately in opposite directions.

2. Windshield wiping apparatus for a vehicle comprising a wiper arm adapted to be mounted on a pivot shaft adjacent one end, linearly reciprocating means at said one end of said arm, means adjacent said pivot shaft in positive engagement with said linearly reciprocating means for actuating said linearly reciprocating means; linearly slidable rack means disposed at the other end of said arm engageable with a pinion means pivotally mounted on a fixed axis at the said other end of said arm, linkage means connecting said linearly reciprocating means and said rack means and connecting means adjacent said pinion means for connecting a wiper blade to said arm.

3. A windshield arm comprising an inner arm section adapted to be mounted on a pivot shaft and an outer arm section connected to said inner arm section for relative pivotal movement about a transverse axis, biasing means extending between said inner arm and outer arm sections for biasing said outer arm section toward an associated windshield, a pivotal member disposed adjacent the free end of said outer arm section, a first linearly slidable member disposed adjacent the free end of said outer arm section, said pivotal member and said first linearly slidable member being in positive engagement whereby linear reciprocation of said first slidable member imparts pivotal motion to said pivotal member, a second linearly slidable member disposed in said inner arm section adapted to be linearly reciprocated in response to oscillation of said arm, a first link rigidly connected to said first slidable member at one end, a second link spanning said pivotal connection between said inner arm section and said outer arm section connected at one end for limited slidable movement to said second slidable member and means for pivotally connecting said first and second links together at their other ends about a transverse axis, whereby reciprocation of said second slidable member positively effects oscillation of said pivotal member through said first and second links while permitting pivotal movement of said connection between said inner and outer arm sections.

4. A windshield arm comprising an inner arm section adapted to be mounted on a pivot shaft and an outer arm section connected to said inner arm section for relative pivotal movement about a transverse axis, biasing means extending between said inner arm and outer arm sections for biasing said outer arm section toward an associated windshield, a pivotal member disposed adjacent the free end of said outer arm section, a first linearly slidable member disposed adjacent the free end of said outer arm section, said pivotal member and said first linearly slidable member being in positive engagement whereby linear reciprocation of said first slidable member imparts pivotal motion to said pivotal member, a second linearly slidable member disposed in said inner arm section adapted to be linearly reciprocated in response to oscillation of said arm, a third slidable member mounted intermediate the ends of said outer arm member for limited slidable movement, a first link rigidly connected to said first slidable member at one end and rigidly connected to said third slidable member at its other end, a second link spanning said pivotal connection between said inner arm section and said outer arm section pivotally connected about a transverse axis to said third slidable member and connected for limited slidable movement to said second slidable member, whereby reciprocation of said second slidable member positively effects oscillation of said pivotal member through said linkage while permitting pivotal movement at said connection between said inner and outer arm sections.

5. A windshield wiper arm comprising an inner arm section adapted to be mounted on a pivot shaft and an outer arm section connected to said inner arm section for relative pivotal movement about a transverse axis, biasing means extending between said inner arm and outer arm sections for biasing said outer arm section toward an associated windshield, a cam follower slidably disposed within said inner arm section for linear slidable motion and adapted to be reciprocated by a cam mounted adjacent said pivot shaft upon oscillation of the arm; linearly slidable rack means and pivotal pinion means disposed in intermeshing engagement adjacent the free end of said outer arm section whereby reciprocation of said rack means imparts pivotal motion to said pinion means, a first link rigidly secured to said linearly slidable rack means at one end, a second link spanning said pivotal connection between said inner arm section connected at one end for limited slidable movement to said cam follower and means for pivotally connecting said first and second links together at their other ends, whereby reciprocation of said cam follower effects oscillation of said pinion through said first and second links while permitting pivotal movement at said connection between said inner and outer arm sections.

6. A windshield wiper arm comprising an inner arm section adapted to be mounted on a pivot shaft and an outer arm section connected to said inner arm section for relative pivotal movement about a transverse axis, biasing means extending between said inner arm and outer arm sections for biasing said outer arm section toward an associated windshield, first means adjacent the free end of said outer arm section for converting linear reciprocating motion to oscillatory rotary motion, second means adjacent the inner arm section for converting oscillatory rotary motion to linear reciprocating motion and linkage means secured to said second means for limited longitudinal movement and to said first means for transmitting motion between said first and second means, said linkage means being articulated for permitting pivotal movement between said inner arm section and said outer arm section.

7. In a windshield wiper construction for a vehicle including a wiper arm adapted to be mounted on a pivot shaft adjacent one end of said arm; said arm comprising an inner section adapted to be mounted on the pivot shaft and an outer section connected to said inner section for relative pivotal movement about a transverse axis, biasing means extending between said inner arm section and said outer arm section for biasing said outer arm section toward an associated windshield, linearly reciprocating means adjacent said pivot shaft and inner arm section, means adjacent said pivot shaft in positive engagement with said linearly reciprocating means for actuating said linearly reciprocating means, linearly slidable rack means disposed adjacent the free end of said outer arm section engageable with pinion means pivotally mounted adjacent said free end of said outer arm section, linkage means secured to said linearly reciprocating means for limited slidable movement and to said linearly reciprocating rack means for transmitting motion between said linearly reciprocating rack means and said linearly reciprocating means, said linkage means being articulated for permitting pivotal movement about a transverse axis between said inner arm section and said outer arm section.

8. A windshield wiper arm comprising an inner arm section adapted to be mounted on a pivot shaft and an outer arm section connected to said inner arm section for relative pivotal movement about a transverse axis, biasing means extending between said inner arm and outer arm sections for biasing said outer arm section toward an associated windshield, a cam follower slidably disposed within said inner arm section for linear slidable motion and adapted to be reciprocated by a cam mounted adjacent said pivot shaft upon oscillation of the arm; linearly slidable means and pinion means disposed in intermeshing engagement adjacent the free end of said outer arm section whereby reciprocation of said linearly slidable means imparts pivotal motion to said pinion means, a first link rigidly secured to said linearly slidable means at one end, a second link spanning said pivotal connection between said inner arm section connected at one end for limited slidable movement to said cam follower and means for pivotally connecting said first and second links together at their other ends, whereby reciprocation of said cam follower effects oscillation of said pinion through said first and second links while permitting pivotal movement at said connection between said inner and outer arm sections.

References Cited by the Examiner

UNITED STATES PATENTS

| 2,790,195 | 4/1957 | Wrobel | 15—250.23 |
| 2,820,238 | 1/1958 | Roth et al. | 15—250.23 |
| 2,825,920 | 3/1958 | Pont et al. | 15—250.23 |
| 2,834,038 | 5/1958 | Kramer | 15—250.23 |
| 2,871,501 | 2/1959 | Wernig | 15—250.23 |

FOREIGN PATENTS 531,799    9/1954    Belgium.

CHARLES A. WILLMUTH, *Primary Examiner.*